(12) United States Patent
Yang et al.

(10) Patent No.: US 8,411,453 B2
(45) Date of Patent: Apr. 2, 2013

(54) MOTHERBOARD FIXING DEVICE AND COMPUTER HAVING SAME

(75) Inventors: Zhong-Ping Yang, Shenzhen (CN); Guang-Dong Yuan, Shenzhen (CN); Chung-Chi Huang, New Taipei (TW); Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 40 days.

(21) Appl. No.: 13/236,662

(22) Filed: Sep. 20, 2011

(65) Prior Publication Data

US 2012/0300397 A1 Nov. 29, 2012

(30) Foreign Application Priority Data

May 26, 2011 (CN) .......................... 2011 1 0138680

(51) Int. Cl.
*H05K 5/00* (2006.01)

(52) U.S. Cl. .............. 361/754; 361/679.58; 361/679.02; 361/756; 361/757

(58) Field of Classification Search ................... 361/754, 361/679.58, 679.02, 756, 75
See application file for complete search history.

(56) References Cited

U.S. PATENT DOCUMENTS

| 6,442,037 B1 * | 8/2002 | Boe ................................ 361/759 |
| 6,556,451 B1 * | 4/2003 | Feightner et al. ............. 361/756 |
| 6,577,497 B1 * | 6/2003 | Kanevsky et al. ........ 361/679.58 |

* cited by examiner

*Primary Examiner* — Yuriy Semenenko
*Assistant Examiner* — Andargie M Aychillhum
(74) *Attorney, Agent, or Firm* — Altis Law Group, Inc.

(57) ABSTRACT

An exemplary motherboard fixing device is for fixing a motherboard onto a case plate inside a computer case. The motherboard fixing device is fixable on the case plate, and includes a first fixing strip and a second fixing strip. The first fixing strip includes a first, second, and third flat plates. The second flat plate is between the first and third flat plates. The first and second flat plates cooperatively define a slide groove for receiving an edge of the motherboard. The second fixing strip includes a bottom plate and a lateral plate. The third flat plate and the bottom plate include first latch hooks. The first latch hooks is engagable in corresponding through holes of the case plate, such that the first and second fixing strips are fixed on the case plate. The lateral plate includes second latch hooks for being latchable on an opposite edge of the motherboard.

10 Claims, 9 Drawing Sheets

MOTHERBOARD FIXING DEVICE AND COMPUTER HAVING SAME

BACKGROUND

1. Technical Field

The present disclosure relates to motherboard fixing devices, and particularly, to a motherboard fixing device able to fix a motherboard to a computer case without screws. The present disclosure also relates to a computer having the motherboard fixing device fixed on the computer case.

2. Description of Related Art

A core component of a personal computer is a motherboard, with which all other major parts (e.g. display device, keyboard, and mouse) are connected. Typically, the motherboard is fixed on a computer case of the computer. Many motherboards include a plurality of fixing holes, and the computer case correspondingly includes a plurality of screw holes. In the process of assembling the motherboard and the computer case, each of the fixing holes must first be aligned with a corresponding screw hole. Each screw then passes through a corresponding fixing hole, and is screwed into a corresponding screw hole, such that the motherboard is fixed on the computer case.

Because each of the fixing holes must be aligned with the corresponding screw hole, and each screw must pass through the fixing hole and be screwed into the screw hole, the assembly process is somewhat laborious. It is inconvenient for users to connect the motherboard to the computer case, and the efficiency of assembly is rather low.

Therefore, what is needed is a means that can overcome the described limitations.

DETAILED DESCRIPTION

Figure 1:
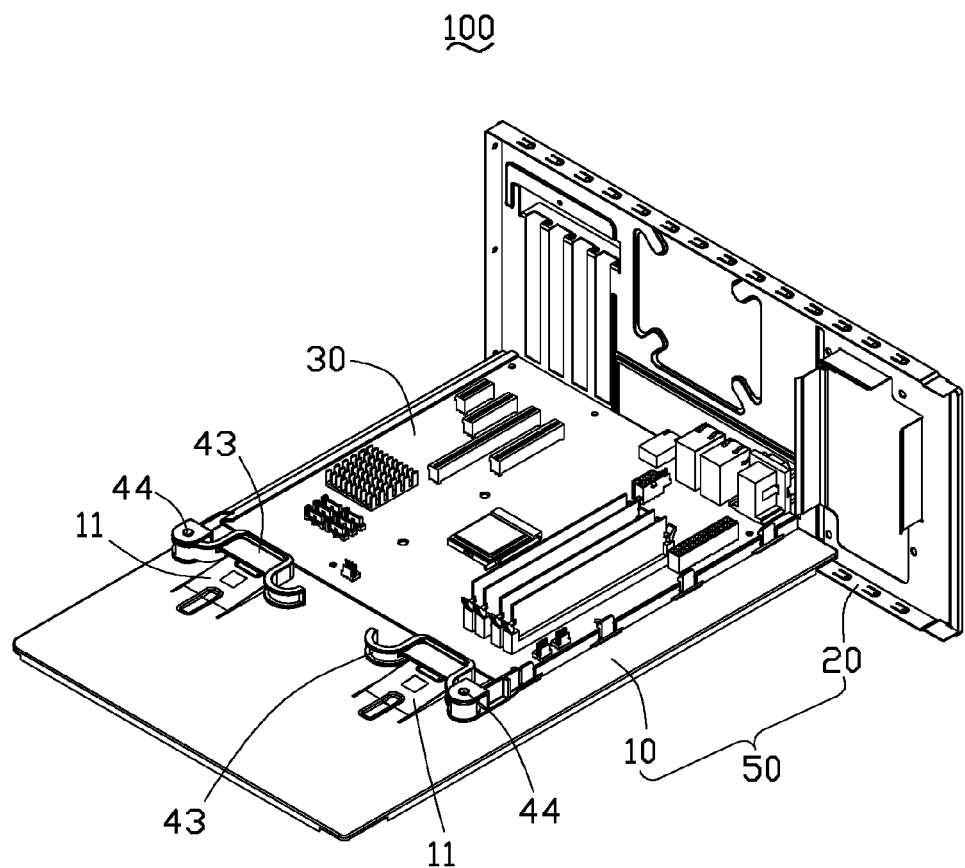
FIG. 1 is an isometric view of part of a computer having a motherboard fixed thereto by a motherboard fixing device, according to an exemplary embodiment.
Figure 2:
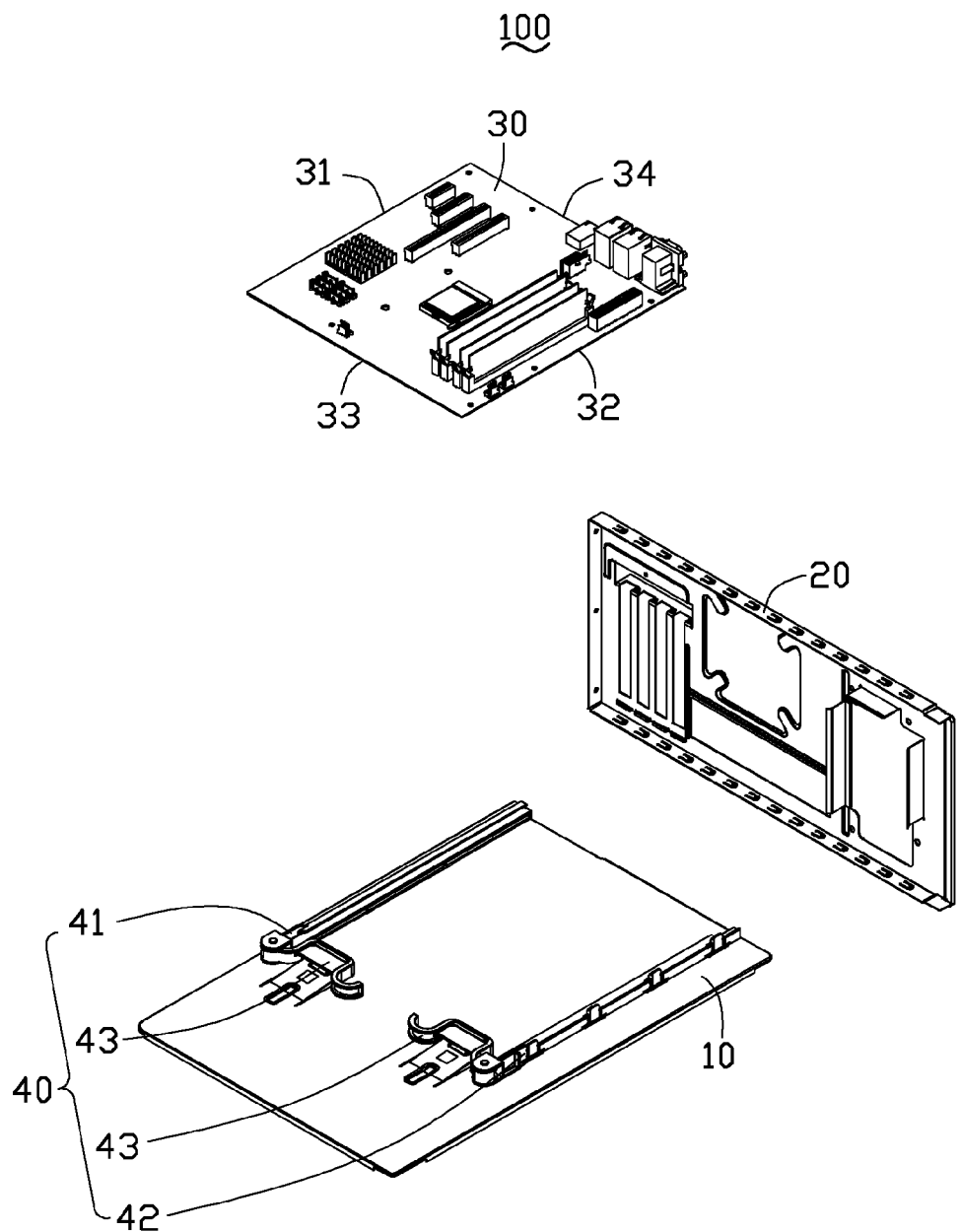
FIG. 2 is an exploded view of FIG. 1.

Embodiments will now be described in detail with reference to the drawings.

Referring to FIGS. 1 through 4, a computer 100 in accordance with an exemplary embodiment is shown. The computer 100 includes a motherboard 30, a motherboard fixing device 40, and a computer case 50.

The motherboard 30 is substantially square, and includes a first side edge 31, a second side edge 32 opposite to the first side edge 31, a third side edge 33, and a fourth side edge 34 opposite to the third side edge 33. The computer case 50 includes a case plate 10, and a vertical plate 20 perpendicular to the case plate 10. The case plate 10, the vertical plate 20, and the motherboard fixing device 40 cooperatively position the motherboard 30 in the computer case 50.

The motherboard fixing device 40 fixes the motherboard 30 on the case plate 10 of the computer case 50. The motherboard fixing device 40 includes a first fixing strip 41, and a second fixing strip 42 opposite to the first fixing strip 41.

The first fixing strip 41 and the second fixing strip 42 are fixed on the case plate 10, and the motherboard 30 is sandwiched between the first fixing strip 41 and the second fixing strip 42.

Figure 4:
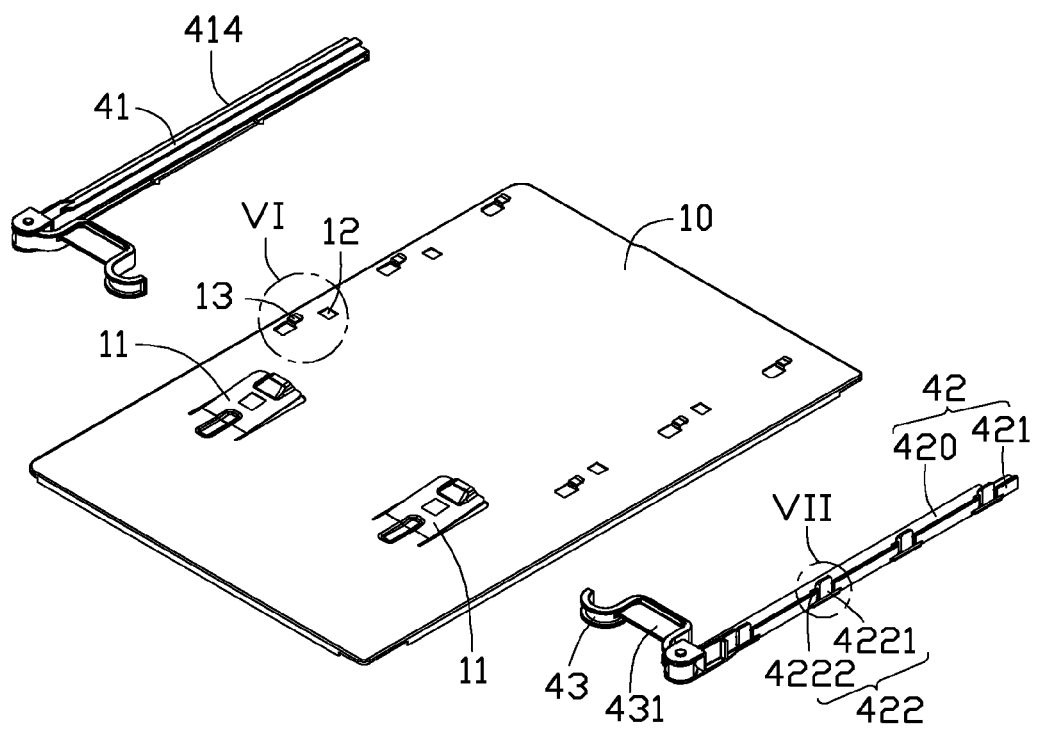
FIG. 4 is an exploded view of the motherboard fixing device and case plate of FIG. 3.
Figure 5:
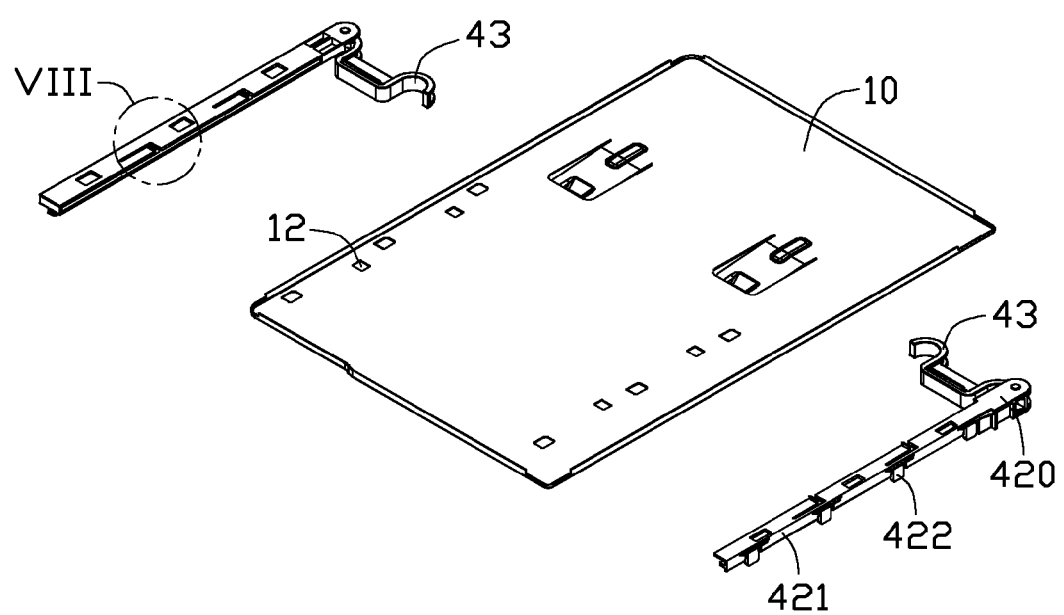
FIG. 5 is similar to FIG. 4, but showing the parts inverted.

Referring to FIGS. 4 and 5, three spaced latch plates 13 are arranged at each of opposite long sides of the case plate 10. The three latch plates 13 at one of the long sides spatially correspond to the first fixing strip 41, and the three latch plates 13 at the other long side spatially correspond to the second fixing strip 42. The three latch plates 13 at each opposite long side of the case plate 10 are arranged in a row, and each of the latch plates 13 is substantially L-shaped. Two through holes 12 are defined in each of the opposite long sides of the case plate 10. Each through hole 12 is located between two corresponding adjacent latch plates 13. The two through holes 12 are arranged in a row, which is aligned differently from (but parallel to) an alignment of the row of the three corresponding latch plates 13.

Figure 6:
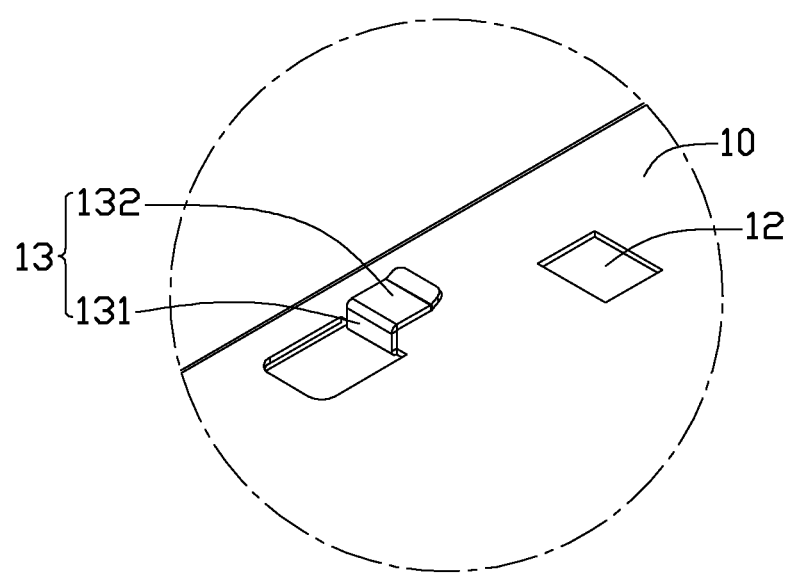
FIG. 6 is an enlarged view of a circled portion VI of FIG. 4.

Referring also to FIG. 6, each of the latch plates 13 includes a connection portion 131 connected to the case plate 10, and a latch portion 132 extending from an upper end of the connection portion 131.

Figure 3:
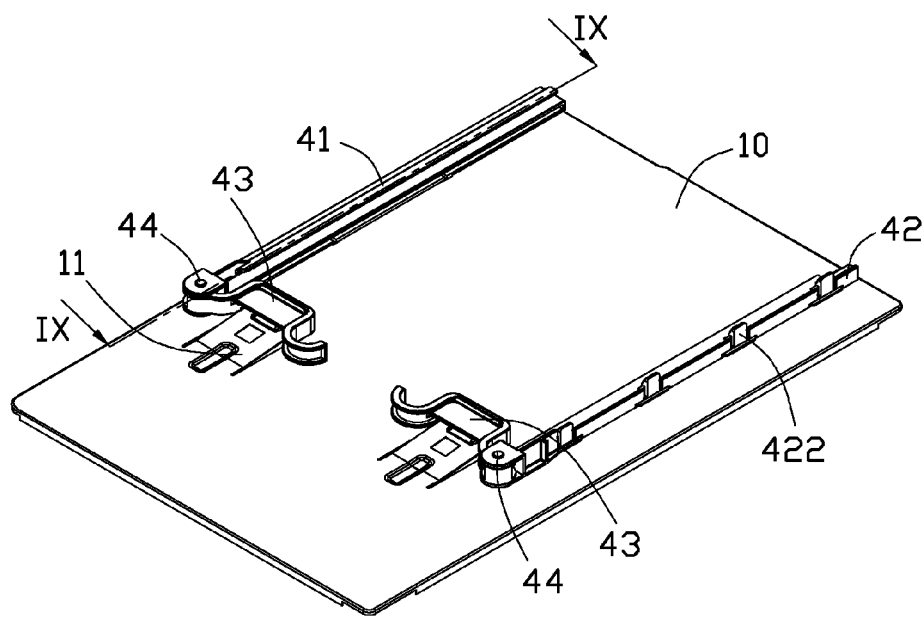
FIG. 3 is a view of the motherboard fixing device and a case plate of the computer of FIG. 1.
Figure 9:
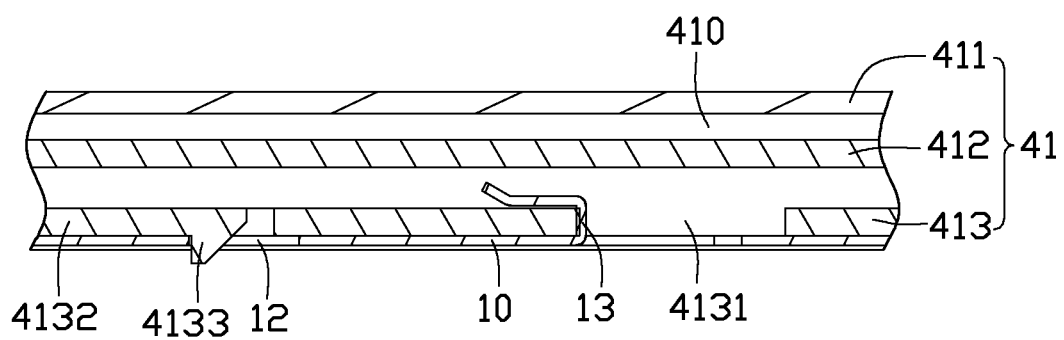
FIG. 9 is an enlarged, cross-sectional view of part of the motherboard fixing device and case plate of FIG. 3, corresponding to line IX-IX thereof.

Referring FIGS. 3 and 9, the first fixing strip 41 includes a first flat plate 411, a second flat plate 412, a third flat plate 413, and a connection plate 414. The first flat plate 411, the second flat plate 412, and the third flat plate 413 are parallel with each other, and the second flat plate 412 is located between the first flat plate 411 and the third flat plate 413. The connection plate 414 connects lateral surfaces of the flat plates 411, 412, and 413, such that the first flat plate 411, the second flat plate 412, and the third flat plate 413 are spaced from each other. Accordingly, a slide groove 410 is defined between the first flat plate 411 and the second flat plate 412.

Figure 8:
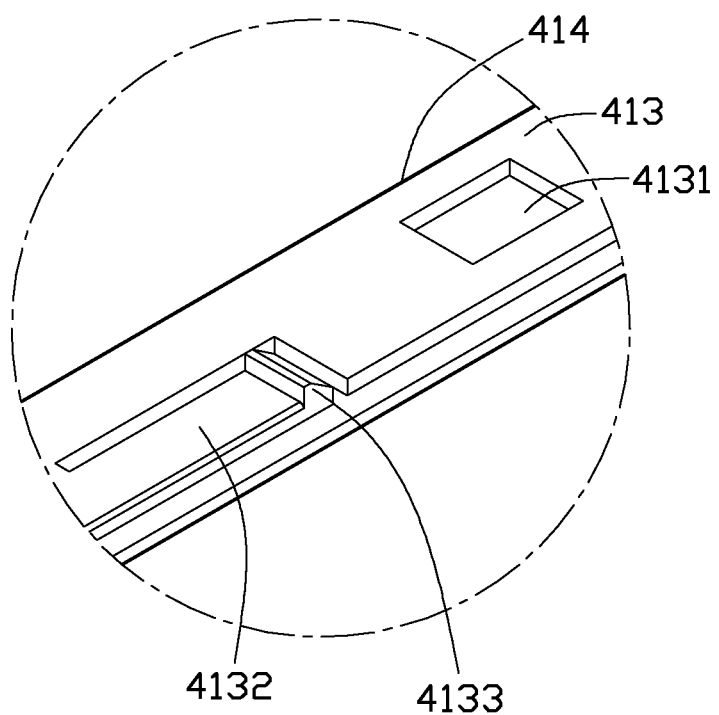
FIG. 8 is an enlarged view of a circled portion VIII of FIG. 5.

Referring also to FIGS. 5 and 8, three latch holes 4131 arranged in a row are defined in the third flat plate 413. The latch holes 4131 spatially correspond to three respective latch plates 13.

Two spaced first latch hooks 4132 arranged in a row extend from the third flat plate 413 towards the case plate 10. The first latch hooks 4132 spatially correspond to the respective through holes 12. Each of the latch hooks 4132 includes a latch tongue 4133 located away from the third flat plate 413. The latch plates 13 pass through the corresponding latch holes 4131, and latch on the third flat plate 413. Meanwhile, the latching tongues 4133 pass through the corresponding through holes 12, and latch on the case plate 10. Accordingly, the first fixing strip 41 is fixed on the case plate 10.

In other embodiments, the latch plates 13 can be omitted. In such case, the first latch hooks 4132 can still connect the first fixing strip 41 to the case plate 10 by engaging in the corresponding through holes 12.

Figure 7:
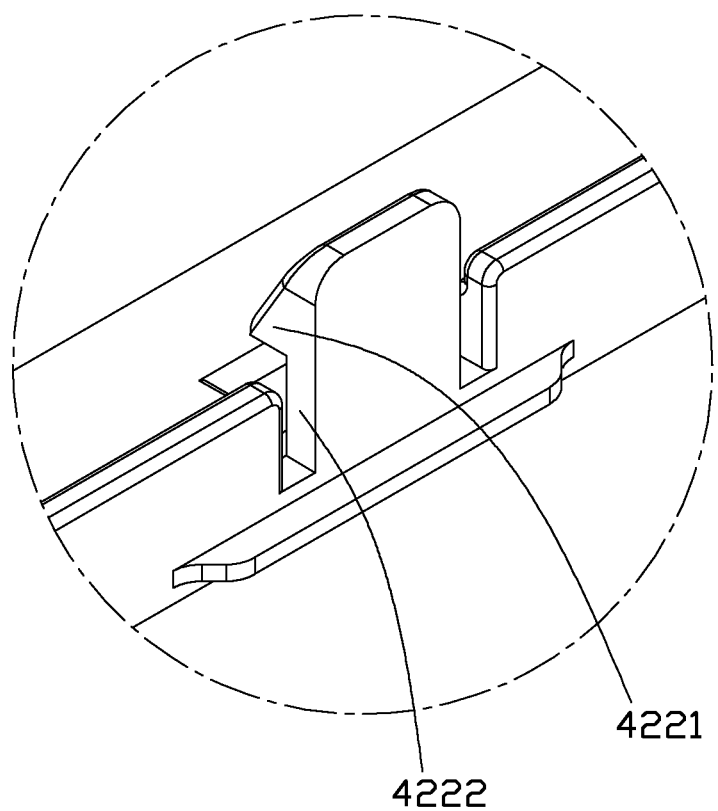
FIG. 7 is an enlarged view of a circled portion VII of FIG. 4.

The second fixing strip 42 includes a bottom plate 420, and a lateral plate 421 perpendicular to the bottom plate 420 (see FIG. 4). The bottom plate 420 is identical to the third flat plate 413, and includes latch holes 4131 and latch hooks 4132. In addition, the second fixing strip 42 includes a plurality of second latch hooks 422 extending up from the bottom plate 420. Each of the second latch hooks 422 includes a vertical main body 4221, and a latch tongue 4222 extending inward from an upper end of the corresponding vertical main body 4221 (see FIG. 7). The latch tongues 4222 latch on the motherboard 30 to fix the motherboard 30 on the second fixing strip 42.

For a more secure fixing of the motherboard 30 on the fixing strips 41, 42, the motherboard fixing device 40 also includes two handles 43 respectively arranged at same ends of the first fixing strip 41 and the second fixing strip 42 (see FIG. 4). Each of the handles 43 includes a stop plate 431. One end of one of the handles 43 is pivotally connected to the first fixing strip 41 by a rotation shaft 44. One end of the other handle 43 is pivotally connected to the second fixing strip 42 by another rotation shaft 44. Accordingly, the handles 43 are rotatable relative to the first fixing strip 41 and the second fixing strip 42, respectively. In addition, two stop portions 11 are arranged on the case plate 10. In the present embodiment, the stop portions 11 are in the form of elastic fingers extending obliquely up from the case plate 10. The stop portions 11 engage with the stop plates 431 to help stop the motherboard fixing device 40 from sliding off the fixing strips 41, 42, thereby preventing the motherboard 30 from sliding off the case plate 10. In other embodiments, the handles 43 and the stop portions 11 may be omitted, because the second latch hooks 422 can still fix the motherboard 30 on the second fixing strip 42 in cooperation with the first fixing strip 41.

Referring also to FIG. 9, in assembly of the first fixing strip 41, the second fixing strip 42, and the case plate 10, the latch holes 4131 and the latch tongues 4133 respectively align with the corresponding latch plates 13 and the corresponding through holes 12. Then, each of the latch plates 13 enters a corresponding latch hole 4131, and each of the latch tongues 4133 enters a corresponding through hole 12. The first fixing strip 41 is pulled towards an outer end of the case plate 10 (i.e., generally towards the corresponding stop portion 11), thereby making the latch plates 13 and the latch tongues 4133 respectively latch in the corresponding latch holes 4131 and the corresponding through holes 12. By essentially the same method described above, the second fixing strip 42 is fixed on the case plate 10. Then, the case plate 10 is fixed to the vertical plate 20 by conventional means such as screws.

After fixing the first fixing strip 41 and the second fixing strip 42 on the case plate 10, the first side edge 31 of the motherboard 30 is inserted into the slide groove 410. Then, the motherboard 30 is pressed towards the case plate 10 until the second latch hooks 422 snappingly latch on the second side edge 32 of the motherboard 30. Next, the third side edge 33 of the motherboard 30 is pushed, so that the motherboard 30 slides towards the vertical plate 20 until the fourth side edge 34 of the motherboard 30 abuts against the vertical plate 20. Finally, the handles 43 are rotated until they latch on the third side edge 33 of the motherboard. In the latched positions, the handles 43 are limited in an area cooperatively defined by the stop portions 11, the first fixing strip 41, and the second fixing strip 42. Typically, the handles 43 are locked in position by the stop portions 11 and the fixing strips 41, 42. Because the stop portions 11 stop the handles 43 from rotating, the motherboard 30 is fixed between the first fixing strip 41, the second fixing strip 42, the handles 43, and the second side edge 20.

When the motherboard 30 needs to be taken off the case plate 10, each stop portion 11 is pressed down until the stop portion 11 is coplanar with or lower than the case plate 10. Then the corresponding handle 43 is rotated away from the vertical plate 20, such that the handle 43 is released from the motherboard 30. Then, the motherboard 30 is pulled away from the vertical plate 20, with the first side edge 31 sliding in the slide groove 410 until the motherboard 30 is completely slid out from the first fixing strip 41 and the second fixing strip 42. In this way, the motherboard 30 can be easily detached from the case plate 10.

In another way to detach the motherboard 30 from the case plate 10, after the handles 43 are released from the motherboard 30, the second latch hooks 422 can be separated from the motherboard 30 by hand or by using a tool. Then the motherboard 30 can be easily lifted out from the case plate 10, with the first side edge 31 disengaging from the slide groove 410.

In the present embodiment, the motherboard 30 is easily fixed on the case plate 10 by the first fixing strip 41, the second fixing strip 42 and the handles 43. Accordingly, no screw holes or screws are needed for fixing the motherboard 30 on the case plate 10, and the efficiency of assembly of the motherboard 30 onto the case plate 10 can be improved.

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A motherboard fixing device for fixing a motherboard in a computer case, the motherboard comprising a first side edge, and a second side edge opposite to the first side edge, the computer case comprising a case plate defining a plurality of through holes, the through holes being arranged in two rows, the motherboard fixing device comprising:
   a first fixing strip fixable on the case plate, the first fixing strip comprising a first flat plate, a second flat plate, and a third flat plate, the first flat plate, the second flat plate, and the third flat plate being parallel with and spaced from each other, the second flat plate being between the first flat plate and the third flat plate, the first flat plate and the second flat plate cooperatively defining a slide groove therebetween, and the third flat plate comprising a plurality of first latch hooks at a bottom thereof; and
   a second fixing strip fixable on the case plate, the second fixing strip comprising a bottom plate, a lateral plate substantially perpendicular to the bottom plate, and a plurality of second latch hooks extending up from the bottom plate, the bottom plate comprising a plurality of first latch hooks at a bottom thereof;
   the first latch hooks of the third flat plate latchable in one of the rows of through holes and the first latch hooks of the bottom plate latchable in the other row of through holes such that the first fixing strip and the second fixing strip are fixed on the case plate and are separate from each other; and
   the slide groove configured for receiving the first side edge of the motherboard and the second latch hooks configured for latching the second side edge of the motherboard such that the motherboard is detachably fixed on the first fixing strip and the second fixing strip.

2. The motherboard fixing device of claim 1, wherein each of the bottom plate and the third flat plate further comprises a plurality of latch holes arranged in a row, and each row of the latch holes is configured to engagingly receive a corresponding row of latch plates of the case plate to facilitate fixing of the bottom plate and the third flat plate on the case plate.

3. The motherboard fixing device of claim 1, further comprising two handles and two rotation shafts, the two handles being respectively arranged at same ends of the first fixing strip and the second fixing strip, one end of one of the handles being pivotally connected to the first fixing strip by one of the rotation shafts, and one end of the other handle being pivotally connected to the second fixing strip by the other rotation shaft, wherein the handles are configured to engage with two corresponding stop portions of the case plate when the handles are rotated to closed positions to facilitate fixing of the motherboard on the first fixing strip and the second fixing strip.

4. The motherboard fixing device of claim 1, wherein each of the first latch hooks comprises a latch tongue, and the latch tongues are latchable on the case plate.

5. The motherboard fixing device of claim 1, wherein the first fixing strip further comprises a connection plate, and the connection plate connects lateral surfaces of the first flat plate, the second flat plate, and the third flat plate, such that the first flat plate, the second flat plate, and the third flat plate are spaced from each other.

6. A computer comprising:
a computer case comprising a case plate, the case plate defining a plurality of through holes, the through holes being arranged in two rows;
a motherboard fixed on the case plate, the motherboard comprising a first side edge, and a second side edge opposite to the first side edge; and
a motherboard fixing device fixing the motherboard on the case plate, the motherboard fixing device comprising:
a first fixing strip fixed on the case plate, the first fixing strip comprising a first flat plate, a second flat plate, and a third flat plate, the first flat plate, the second flat plate, and the third flat plate being parallel with and spaced from each other, the second flat plate being between the first flat plate and the third flat plate, the first flat plate and the second flat plate cooperatively defining a slide groove therebetween, and the third flat plate comprising a plurality of first latch hooks at a bottom thereof; and
a second fixing strip fixed on the case plate, the second fixing strip comprising a bottom plate, a lateral plate substantially perpendicular to the bottom plate, and a plurality of second latch hooks extending up from the bottom plate, the bottom plate comprising a plurality of first latch hooks at a bottom thereof;
the first latch hooks of the third flat plate latched in one of the rows of through holes and the first latch hooks of the bottom plate latched in the other row of through holes such that the first fixing strip and the second fixing strip are fixed on the case plate and are separate from each other; and
the slide groove configured for receiving the first side edge of the motherboard and the second latch hooks configured for latching on the second side edge of the motherboard such that the motherboard is detachably fixed on the first fixing strip and the second fixing strip.

7. The computer of claim 6, wherein each of the bottom plate and the third flat plate further comprises a plurality of latch holes arranged in a row, the case plate further comprises a plurality of latch plates arranged in two rows, and each row of the latch plates is engaged in a corresponding row of the latch holes to facilitate fixing of the bottom plate and the third flat plate on the case plate.

8. The computer of claim 6, wherein the motherboard fixing device further comprises two handles and two rotation shafts, the two handles are respectively arranged at same ends of the first fixing strip and the second fixing strip, one end of one of the handles is pivotally connected to the first fixing strip by one of the rotation shafts, one end of the other handle is pivotally connected to the second fixing strip by the other rotation shaft, the case plate further comprises two stop portions, and when the handles are rotated to closed positions, the handles engage with the corresponding stop portions to facilitate fixing the motherboard on the first fixing strip and the second fixing strip.

9. The computer of claim 6, wherein each of the first latch hooks comprises a latch tongue, and the latch tongues are latched on the case plate.

10. The computer of claim 6, wherein the first fixing strip further comprises a connection plate, and the connection plate connects lateral surfaces of the first flat plate, the second flat plate, and the third flat plate, such that the first flat plate, the second flat plate, and the third flat plate are spaced from each other.

* * * * *